United States Patent [19]

Vitands et al.

[11] Patent Number: 5,505,773
[45] Date of Patent: Apr. 9, 1996

[54] FIBER OPTIC BUFFER TUBE COMPOUND

[75] Inventors: Egils Vitands, Lisle; Robin M. Gryziecki, Aurora, both of Ill.

[73] Assignee: Amoco Corporation, Chicago, Ill.

[21] Appl. No.: 353,078

[22] Filed: Dec. 9, 1994

[51] Int. Cl.⁶ .......................... C09D 5/34; C09D 191/06
[52] U.S. Cl. ............................................... 106/272; 252/28
[58] Field of Search ................................ 106/272; 252/28

[56] References Cited

U.S. PATENT DOCUMENTS

| | | | |
|---|---|---|---|
| 3,714,041 | 1/1973 | Asgiersson | 252/13 |
| 3,893,961 | 7/1975 | Walton et al. | 260/23 |
| 3,893,962 | 7/1985 | Walton et al. | 260/28.5 |
| 4,366,075 | 12/1982 | Beach | 252/28 |
| 4,370,023 | 1/1983 | Lange et al. | 350/96.23 |
| 4,701,016 | 10/1987 | Gartside, III et al. | 350/96.23 |
| 4,705,571 | 11/1987 | Lange et al. | 106/287.1 |
| 4,709,982 | 12/1987 | Corne et al. | 350/96.23 |
| 4,810,395 | 3/1989 | Levy et al. | 252/28 |
| 4,839,970 | 6/1989 | Goetze et al. | 350/96.23 |
| 5,050,959 | 9/1991 | Randisi | 385/100 |

*Primary Examiner*—David Brunsman
*Attorney, Agent, or Firm*—Mary Jo Kanady; William C. Clarke; Wallace L. Oliver

[57] ABSTRACT

A thixotropic gel composition is disclosed as a fiber optic buffer tube compound. The composition as a fiber optic buffer tube compound is resistant to syneresis and phase separation, and to ingress of water and water vapor. The composition has low temperature flowability at −40° C. as determined by a cone penetration test and has continued high temperature consistency at +80° C. The composition retains its low temperature flowability property after a heat aging test at 93° C. The composition comprises polybutene, polyethylene wax, hydrophobic fumed silica, and, optionally, an antioxidant.

5 Claims, No Drawings

FIBER OPTIC BUFFER TUBE COMPOUND

FIELD OF THE INVENTION

This invention relates to an improved thixotropic gel composition for filling communication cables containing fiber optic conductors.

BACKGROUND OF THE INVENTION

Communication cable filling compounds are employed, in general, as water barrier materials and, specifically, in applications involving fiber optic cables as both water barrier materials and as protective compounds. Formulations of cable fillings compounds accordingly are determined by application requirements, which can vary widely.

Fiber optic cables are increasingly employed in transmission of data and other communications. The fiber optic element, for protection against mechanical shock or bending since the fiber optic element is relatively fragile, is inserted into a protective casing. The space between the fiber optic element, or a series of such elements, is filled with a thixotropic composition which is a stable cushioning agent to protect the fiber optic elements but which does not deleteriously affect the optical qualities of the elements.

The required properties of the filling compound can be mutually exclusive. The compound is required to retain its softness at low temperature, −40° C., and to be resistant to flow at high temperature, +80° C. The compound is required to retain its softness at low temperatures, −40° C., after exposure to a high temperature, 93° C. (200° F.), for a prolonged period. The filled communication cable containing the filling compound is required to be waterproof and gas tight. One method of filling the sheaths of these communication cables requires injecting the sheaths of these cables with the filling compound in a fluid state under pressure. In another method, the filling compound can be introduced under pressure into the cable sheath during manufacture and extrusion of the cable sheath. During the filling process, the filling compound penetrates the voids between the optic fibers and its cable sheathing under high pressure, creating high shearing stresses. The filling compound should retain its characteristics despite the shearing stresses by not exhibiting phase separation or change in viscosity. During use, the filling compound needs to be sufficiently fluid to avoid build-up of tensile or compressive forces upon the optic fibers to cause modification of the optic fiber's optical characteristics and yet be resistant to flow to ensure that bending of the cable will not cause voids within the cable sheathing.

The filling compound accordingly is required to have a low viscosity at room temperature to allow filling of cables during the cable manufacture and yet not demonstrate a hardness at low temperatures which will result in a mechanical stressing of the optic fibers due to increase of viscosity during use. Preferably, the filling compound exhibits softness at low temperatures and demonstrates no change in viscosity or phase separation after exposure to high temperatures up to 93° C. for prolonged periods.

The requirement that the filling compound retain its softness at low temperature −40° C. and yet be resistant to flow at high temperature +80° C. conventionally has been treated in the prior art by employing a thickening agent to form a gel-like substance comprising a petroleum hydrocarbon or a silicone, or a polyglycol or a similar compound, and a thixotropic agent. The petroleum hydrocarbon and the thixotropic agent as a mixture comprises a non-flowing or nearly solid yet gel-like body while in a rest condition but the mixture will assume the properties of a fluid under mechanical stress, yet be resistant to flow at a high temperature.

However, the mutually exclusive requirements of the filling compound, that the filling compound retain its softness at low temperature and yet be resistant to flow at high temperature, have been difficult to satisfy because of the conflicting physical characteristics of the mixture components. A thickening agent is frequently utilized to control the flow rate at high temperatures. However, exposure of the filling compound to high temperatures can affect the resultant softness at low temperature by causing the filling compound to irreversibly become more brittle and hard at the low temperature.

The petroleum hydrocarbon conventionally has been selected from the group consisting of a petroleum jelly, a liquid polybutene, a hydrocarbon oil with a low aromatic content, or an aliphatic and an aromatic hydrocarbon oil or mixtures thereof. The thixotropic agent typically is a non-hydrocarbon material a silicious material such as diatomaceous earth, colloidal silica, pyrogenic silica, silica aerogel and similar silica materials in a finely divided state.

The inclusion of silicious material in the filling composition as a thixotropic agent in the form of an extremely fine powder, because of the dispersion of the powder into the gel, can result in a hydrophilic medium subject to the entry of water and water vapor from punctures or breaks in the cable's outer sheathing.

Silicious materials in a finely-divided physical state of colloidal dimensions with a high surface area can demonstrate hydrophilic surface properties which can be detrimental to applications requiring a water barrier or water vapor barrier.

Although filling compounds for communication cables are primarily intended for filling the spaces within the communication cables, the filling compounds are used to inhibit penetration of water or water vapor, particularly buried cables which are subject to the ingress of water, or to entry and condensation of water vapor.

The protective casing of the fiber optic communication cables and/or wave guides are designed as water-proof shields enclosing the fiber optic elements. Water or water vapor can enter a cable through punctures or breaks in the cable's outer sheathing or wave guide. These breaks can occur as a result of mechanical damage to the protective casing or of initial defects incurred during production or laying of the cable. Once a break has occurred in the outer sheathing, the entry of water is permitted and allows water to flow along the cable and to mix with the filling compound.

The filling compound is also known to be used as a water blocking compound to inhibit the introduction of water into cables as a result of damage to the cable sheaths when cables are installed in ducts or directly buried in the ground, and to prevent such water from travelling along the interior from the point of entry.

Conventional petroleum gels have been relied upon as filling compounds with the addition of hydrocarbon microcrystalline waxes and low molecular weight polyethylene resins to overcome water entry problems and to diminish migration and leakage from cables having a flaw. Petroleum gels have a tendency to seep from cable ends or from a flaw developed in the cable especially at elevated temperatures to which the cable might be subjected in installation or in use in warm environments. Inclusion of amounts of silicious material in the petroleum gel has been found to result in a filling composition in which migration of the petroleum gel has been considerably reduced, but with lessened inhibition to water penetration.

The requirement that the filling compound retain its softness at low temperature −40° C. and yet be resistant to flow at high temperature +80° C. conventionally has been satisfied by use of a thickening agent to form a gel-like substance. The thickening agent typically has been a silicious material which, as noted above, may have hydrophilic characteristics.

The tendency for the components of a filling compound to separate because of poor compatibility, i.e., to demonstrate a degree of syneresis, can cause the filling compound to be unsuitable for applications which are typically at higher temperatures, such as +80° C.

The tendency for the components of a filling compound to develop a heat history upon exposure to elevated temperatures, i.e, 93° C. (200° F.), for prolonged periods can cause the filling compound to be unsuitable for applications which are typically at low temperatures, i.e., at −40° C., because of irreversible development of a more brittle and harder gel formation at the higher temperatures.

Two tests have been devised to determine the softness characteristics of a buffer tube filing compound at −40° C. and at 80° C. The first test comprises a cone penetration test at −40° C., ASTM D937. The second test comprises a slump test at +80° C. for a period of 24 hours which requires no separation of filling components and no loss of filling compound from a u-shaped channel lying on its side for the required period and temperature. A variation of the slump test comprises the requirements that no drip out flows from a phase separation from a vertically suspended tube over a period of 24 hours at +80° C. This variation is termed a drip test. Drip out is defined as a drip from a phase of the separation.

An aging test of the filling compound has been devised to determine the softness characteristics of a buffer tube filling compound after exposure to an elevated temperature, 93° C. (200° F.) for 45 minutes. The compound is then allowed to cool to room temperature, +21° C., and then is cooled to −40° C. The cone penetration test, ASTM D937, is repeated at −40° C. to determine softness characteristics of the compound after the heat treatment at 93° C.

It is therefore an object of this invention to provide a thixotropic gel composition for filling communication cables containing fiber optic conductors which has an improved resistance and inhibition to penetration of water and water vapor, particularly buried cables which are subject to the ingress of water, or to entry and condensation of water vapor which can enter through punctures or breaks in the cable's outer sheathing or wave guide.

It is therefore an object of this invention to provide a thixotropic cable filling compound which retains its softness at low temperature, −40° C. even after exposure to an elevated temperature, is resistant to flow and syneresis at temperatures to +80° C. and the thixotropic cable filling compound has resistance to ingress of water and water vapor.

DESCRIPTION OF PRIOR ART

The prior art teaches numerous approaches to overcoming the above requirements for thixotropic cable filling compounds. Conventional cable filling compounds typically are formulated to prevent the ingress of water and comprise an organic liquid thickened with a suitable substance such as a silicious material, a fibrous compound. A typical thickening agent is taught in U.S. Pat. No. 3,714,041 which teaches organic liquids thickened with 25 to 95 wt. % of colloidal silica selected from the group consisting of silica aerogel, pyrogenic silica and mixtures thereof and from 75 to 5 wt. % of fibrous asbestos for preparation of thixotropic organic compounds of hydrocarbon liquids useful as greases, resinous gel coats and the like. A synergistic thickening effect in organic liquids such as hydrocarbon oils is achieved in the presence of a colloidal silica as the primary component and a particulate inorganic solid as the secondary component, i.e., a fibrous asbestos. U.S. Pat. No. 3,893,961 teaches a thixotropic water resistant telephone cable splice closure filling composition characterized by a melting point above 80° C., which composition comprises (a) from about 85% to about 98% by weight of polybutene having a viscosity within the range of 200 to about 1750 SUS/98.8° C., (b) from 1% to about 10% by weight of polyethylene of molecular weight in the range of 10,000–20,000 in solution with the polybutene, and (c) from about 0.25% to about 6%, preferably from about 1.0% to about 3.0%, by weight of a gelling agent selected from (i) hydrogenated castor oil and (ii) finely divided silica. The polybutene and polyethylene are blended at a temperature within the range of 120°–130° C. for about 19 hours to insure solution of the polyethylene. The composition is then filled into containers at a closely-controlled temperature, 100°–105° C. The rate of cooling 3°–4° C. per hour is vital to obtain required properties, i.e., MP—at least 80° C., cone penetration—ASTMD937 of 300–400 units. A disadvantage of the composition is that it is a thixotropic, semi-solid, petrolatum-like material. A wax may also be included, the wax selected from synthetic Fischer-Tropsch type waxes, paraffin waxes, microcrystalline waxes and natural waxes. Similarly, U.S. Pat. No. 3,893,962 teaches a hydrocarbon thixotropic telephone cable filling composition comprising a liquid polybutene, polyethylene of average molecular weight from 10,000 to 20,000, a microcrystalline slack wax of mineral oil content of 15–45%, and a second wax which can be a paraffin wax, a synthetic Fischer-Tropsch wax or a natural wax. An illustrative example teaches a large amount of wax, 38%.

U.S. Pat. No. 4,366,075 discloses a composition for filling telecommunication cables containing conductor wires wherein the composition contains a small amount of siliceous material in a petroleum jelly to result in a filling composition in which migration of the petroleum jelly-based filler composition into a cellular material is considerably reduced. The siliceous material includes diatomaceous earth, colloidal silica, pyrogenic silica, silica aerogel and similar silica materials. A suitable siliceous material is a colloidal silica of particle size of from 70 to 140 angstroms and a surface area of 50 m$^2$/g to 400 m$^2$/g. The petroleum jelly is defined as comprising a purified mixture of semi-solid hydrocarbons having a density in the range of about 0.81 to 0.88 at 60° C. and a melting point between 38° C. and 60° C. The amount of siliceous material employed is 1% to 6% by weight of the jelly to reduce effectively the mobility of the jelly at temperatures to about 70° C. and to avoid the problem of migration of the filler composition into the cellular insulation which comprises a polyolefin and is permeable to petroleum jelly. Although testing of the composition is done at 70° C., the temperature of 70° C. is indicated as not an operational temperature, although temperatures to 85° C. could be encountered. Operational tests were at 60° C. and 70° C.

The prior art also teaches numerous approaches to overcoming the above requirements for thixotropic filling compounds specifically suitable for fiber optic cables which require that tensile forces or pressure forces are not created on the light waveguides at low temperatures or phase separation at high temperatures, and also prevent the ingress of water.

A fiber optic cable can comprise a strand element which has several light waveguide fibers within a protective casing which is filled with a easily shapeable filling compound which remains very soft and which displays no tendencies towards aging, melting or freezing. U.S. Pat. No. 4,705,571 teaches a filling compound for light waveguide cables which comprises a polyglycol and/or polyolefin, fumed silica, and a multi-functional silane compound. The fumed silica acts as a filler and the multifunctional silane compound is provided as a crosslinking/coupling component to effect a chemical bonding between the filler and the polyglycol and/or the polyolefin and also to effect a chemical bonding of the fluid phase of the composition since it is known that weak hydrogen bonding of fumed silica compounds with thixotropic oils tends to be broken, creating a phase separation, i.e., a drip-out from the cable at high temperature. U.S. Pat. No. 4,709,982 teaches a gelled-oil filling compound for optical fiber cables to inhibit penetration of water or water vapor wherein the filling compound consists essentially of a hydrocarbon oil with an aromatic content not greater than 12% and a block copolymer having at least one molecular segment that tends to confer solubility in the oil and at least one molecular segment which tends to inhibit solubility in the oil such that the block copolymer forms a gel with the oil. The block copolymer has a weight average molecular weight in the range of 200,000 to 2,000,000, the amount of the block copolymer being chosen so that the compound resists drainage from a polyethylene tube suspended vertically for 24 hours at 70° C. but has a viscosity at 120° C. not greater than 1000 cps. The amount of block copolymer required is determined empirically for each hydrocarbon oil of a different aromatic content.

U.S. Pat. No. 4,370,023 teaches a gel-like substance for filling a longitudinal water-tight waveguide cable within the range of from $-10°$ C. to $+80°$ C. wherein the cable contains at least one optical waveguide such as a fiber supported in a sheath by the viscous gel-like substance. The gel-like substance is a mixture of a hydrocarbon oil and a thixotropic agent. The hydrocarbon oil can be an aliphatic, an aromatic or a mixture thereof. The thixotropic agent can consist of colloidal silica acid with or without $Al_2O_3$.

U.S. Pat. No. 4,701,016 teaches a grease composition comprising 77 to 95% by weight of an oil which can be a polybutene and from 2 to 15% by weight of hydrophobic fumed silica and, optionally, up to 15% of a bleed inhibitor comprising block copolymers and semi-liquid rubbers such as a high viscosity polyisobutylene. A bleed inhibitor improves retention of the oil up to about 60°–80° C. so that room temperature oil separation is not greater than about 7% in a selected composition.

U.S. Pat. No. 4,810,395 discloses a gelled grease composition useful for optical fiber cables comprising oil, colloidal particle filler, and, optionally, a bleed inhibitor. The oil can be a paraffinic or naphthenic oil, or a polybutene oil, and the colloidal particle filler can be hydrophobic or hydrophilic fused silica. The optional bleed inhibitor can be a block copolymer. Addition of the block copolymer improves oil retention in the composition and allows reduction of the amount of colloidal particles of fused silica, which can be as high as 15% by weight of the composition. The colloidal particles are added to the mixture to prevent syneresis of the gel. The composition is disclosed as having a low critical yield stress and a low shear modulus. The addition of the block copolymer is disclosed also as making possible a composition having very low critical yield stress.

U.S. Pat. No. 4,839,970 disclosed an easy-to-process filling compound for a light waveguide cable which is taught as not exhibiting excessive hardness and mechanical stressing of the light wave guide at low temperatures or phase separation and resulting drip-out of the filling compound from the cable at high temperature. The compound comprises at least 50% polypropylene glycol and 1 to 50% of a second component thixotropic agent chosen from the group consisting of fumed silica, aluminum oxide, aluminum hydroxide, a halogen-containing organic compound and mixtures thereof. Polypropylene glycol is disclosed as largely hydrophobic, compatible with materials used to coat the fibers, resistant to aging and has a low freezing point, below $-60°$ C. In the presence of the thixotropic agent, the filing compound is stated as drip-proof in days at $+20°$ C.

U.S. Pat. No. 5,050,959 discloses a lubricating or cushioning compound for fiber optic elements which are carried in a sheath. The composition comprises 90–99% of a polybutene of average molecular weight of from about 250 to 500 and a gelling agent comprising 1–10% hydrophobic fumed silica. The cushioning compound is disclosed as also containing an oily polybutene of average molecular weight of from 1000 to 2000 as a lubricating fluid in an amount of from about 0% to about 10% by weight of the composition. Example 1 teaches a 1.1% level of the second polybutene.

A disadvantage of the above-cited patents for compounds suitable for optical fiber cables include the requirement for relatively large amounts of silica to meet the appropriate service requirements in U.S. Pat. Nos. 4,705,571, 4,810,395, and 4,839,970. Also, U.S. Pat. No. 5,050,959 teaches the requirement of a second polybutene, the amount of which of from 0 to 10% needs to be determined. Additionally, U.S. Pat. Nos. 4,701,016 and 4,709,982 teach a requirement of a block copolymer, the amount of which must be determined empirically. U.S. Pat. No. 4,370,023 teaches a compound suitable for temperature within the range of from $-10\%$C. to $+80\%$C., a temperature operational range shorter than the $-40°$ C. to $+80$C. temperature range of the instant invented composition.

Despite the extensive work in this area, the prior fiber optic buffer tube compounds have not been entirely successful. This is due in part to the fact that the requirements of the filling compounds are contradictory in that the compounds should not exhibit excessive hardness at low temperatures despite a heat history of over $+80°$ C. to cause mechanical stressing of the fiber optic element, not exhibit phase separation at high temperatures and yet have material consistency so as to be resistant to ingress and propagation of water and water vapor within the fiber optic buffer tube at temperatures over the range of from about $-40°$ C. to about $+80°$ C. Preferably, the filling compound should exhibit softness at low temperatures of $-40°$ C. and demonstrate no change in viscosity or phase separation after exposure to high temperatures up to 93° C. for prolonged periods.

SUMMARY OF THE INVENTION

This invention relates to a thixotropic gel fiber optic buffer tube composition resistant to syneresis and phase separation, and to ingress of water and water vapor, the thixotropic gel composition having low temperature flowability at $-40°$ C. and continued high temperature consistency at $+80°$ C. for use as a fiber optic buffer tube filling compound. The composition comprises polybutene, polyethylene wax, hydrophobic fumed silica and optionally, an antioxidant. The composition by weight is about 86 to about 90% polybutene, about 1 to about 6% polyethylene wax, and about 8 to about 12% hydrophobic fumed silica in percentages of the composition. An antioxidant, in an amount of less than 1 percent by weight, can be present in the fiber optic buffer tube composition as an optional component. The fiber optic cable and wave guide filling compound exhibits softness at low temperatures despite a heat history of up to 93° C. and thus does not cause a mechanical stressing of the fiber optic elements at low temperatures nor does the filling compound demonstrate a phase separation or change in viscosity after exposure to a high temperature for prolonged periods. The filling compound demonstrates a hydrophobic characteristic which repels the ingress of water and water vapor. The composition is prepared as a mixture in which the separate components contribute necessary characteristics to the thixotropic gel composition.

DETAILS OF THE INVENTION

This invention provides an improved filling composition for fiber optic cables and wave guides. The filling compound is designed to fill the space or interstices between the fibers of the fiber optic elements and their protective sheath or protective casing of the wave guide and to be resistant to ingress of water and water vapor. This invention provides an improved filling composition for fiber optic cables and wave guides wherein the filling compound provides an improved resistance to syneresis, is free from excessive tackiness which prevents easy clean-up of equipment and personnel, and demonstrates improved resistance to deterioration to heat accompanied by increased hardness due to a heat history, by maintaining a stable viscosity over a broad temperature range. Surprisingly, the instant invented composition demonstrates a resistance to change in viscosity upon exposure to high temperature conditions for long periods.

The filling compound of the instant invention meets the requirements of a slump test and a cone penetration test, and comprises, by weight, (1) from about 86 to about 90% polybutene, preferably about 88%, of a Saybolt Universal viscosity within the range of from about 576 to about 2441 SUS at 38° C., of a number average molecular weight in the range of from about 380 to about 560, and a specific gravity of 0.845–0.871 at 15.5° C., (2) about 1 to 6%, preferably about 2%, polyethylene wax of a number average molecular weight of from about 1500–5000 preferably an average molecular weight of about 2000, and (3) about 8 to about 12%, preferably about 10%, finely-divided hydrophobic fumed silica which has been treated with a dimethyl silicone fluid to render the silica surface extremely hydrophobic. An optional antioxidant, less than 1%, such as tetrakis [methylene (3,5-di-tert-butyl- 4-hydroxy-hydrocinnamate)]methane and the butylated reaction product of p-cresol and dicyclopentadiene can be added to the fiber optic buffer tube composition. Formulation ranges other than indicated above result in unsatisfactory fiber optic buffer tube compounds as determined by a slump test and a cone penetration test.

In the prior art, buffer tube compounds typically are thixotropic gels used as insulating materials in fiber optic cables and wave guides as barriers between the fiber optic elements and the surrounding protective element to insulate the fiber elements from water, cushion the elements against impact and prevent the buildup of stresses on the fiber elements caused by binding of the cable or movement of the waveguide. However, prior art buffer tube compounds can demonstrate a susceptibility to heat deterioration upon exposure to high temperatures for prolonged periods.

The typical polybutene constituent in the prior art is a viscous oily liquid which is prepared by the low temperature polymerization of a refinery gas stream containing polymerizable olefins, i.e., mixtures of butene-1, butene-2, isobutylene and butanes, but predominantly butenes, in the presence of an olefin polymerizing catalyst by any suitable known method. A typical example of such known method comprises reacting a starting material of butane-butene fraction (available as side-product during the cracking of naphtha into ethylene or propylene) at −30° to +30° C., in the presence of a Friedel-Crafts catalyst such as aluminum chloride, magnesium chloride, boron fluoride, titanium tetrachloride and complexes thereof, or with or without addition of an organic halide or chloric acid, in which instance no solvent is required as butane and unreacted olefins act as the solvent. The resulting polybutene is usually settled in a tank to remove the catalyst and is, if necessary, washed with alkali, water, nitric acid, sulfuric acid, oxalic acid and the like, or further treated with an aluminum oxide and activated clay to complete removal of all residual catalyst particles. The treated product may be washed to separate unreacted gas, stripped of light polymers and further, if necessary, refined. In the composition of the instant invention, Saybolt Universal viscosity, ASTMD2161, of the polybutene can range from about 576 to about 2441 SUS at 38° C., preferably about 1005. The number average molecular weight of the polybutene can be in the range of from about 380 to about 560, preferably about 460. In centistokes, the polybutene has a kinematic viscosity, ASTMD445, within the range of from about 116 to about 227 cst at 38° C., and from about 29 to 35 cst at 99° C., and more preferably from about 210 to about 227 cst/38° C., and a number average molecular weight by vapor phase osmometry of about 460. A suitable polybutene is L-100 or a mixture of L-100 and L-65 or a mixture of H-15 and L-65 or L-100 polybutenes from Amoco Chemical Company, Chicago, Ill. Polybutene H-15 has a viscosity in centistokes at 99° C. of 29 to 35 cst, ASTMD445, and a number average molecular weight of 560. Mixtures of polybutene can be used as long as these mixtures have a viscosity within the appropriate range and a number average molecular weight within the appropriate range.

The gelling agent is a finely divided colloidal silica, which also acts as a filler in the composition. The finely divided colloidal silica is used in an amount ranging from about 8% to about 12% by weight of the buffer tube composition. In the composition of the present invention, a treated fumed silica, Cal-O-Sil® TS720, available from the Cabot Corporation, Cab-O-Sil® Division, Tuscola, Ill., is preferred.

The fiber optic buffer tube compound should have a high continued resistance to flow at an elevated temperature for prolonged periods, that is, to above 80° C. so that when it is subjected to continued high ambient temperatures such as may be encountered during operation of the cable, it will not tend to flow from one portion of the cable to another portion of the cable, thereby creating hydrostatic forces within the cable which would tend to weaken the cable sheathing, and to avoid the problem of migration of the filler composition into the sheathing of the cable. The compound should demonstrate a high degree of compatibility of the composition components and minimum amount of syneresis, i.e., separation of liquid components from solid components, wherein separated liquid components would be free to travel within the confines of the cable sheathing. The compound must demonstrate that it is soft and flowable at a low temperature, that is to −40° C., so that even in a cold environment, the compound retains its characteristics of being soft and plastic and remains in a thixotropic gel phase.

The improved fiber optic buffer tube compound of this invention with continued high resistance to flow under conditions of prolonged exposure to high temperatures, which is resistant to ingress of water and water vapor, and has low temperature flowability at −40° C. and high temperature consistency at +80° C., is obtained by a selective blending of components comprising (1) a polybutene of a Saybolt Universal viscosity within the range of from about 576 to about 2441 SUS at 38° C., ASTMD2161, preferably a polybutene of a kinematic viscosity of 210–227 cst/38° C., ASTM D–445, a number average molecular weight in the range of from about 380 to about 560, preferably about 460, specific gravity 0.845 to 0.871, preferably 0.850 to 0.865, at 15.5° C., ASTM D–1298; (2) polyethylene wax of low molecular weight 1500–5000, average viscosity 100–250 cps/140° C., high melting point 200°–240° F., and soluble in polybutene at an elevated temperature of 180° F.; and (3) hydrophobic fumed silica with no surface hydroxyl groups but with surface siloxane polymer groups.

Treated fumed colloidal silica suitable for use in the present invention is distinguished as comprising a high purity finely-divided hydrophobic fumed silica which has been treated with a dimethyl silicone fluid to replace surface hydroxyl groups on the fumed silica with a polydimethyl siloxane polymer. The surface chemistry of the treated fumed silica accordingly is completely different from fumed silica by changing the nature of the silica surface from hydrophilic to extremely hydrophobic.

The polyethylene wax present in the thixotropic gel composition unexpectedly increases and stabilizes the high temperature flow resistance at +80° C. and does not affect the softness at low temperature −40° C. Polyethylene waxes useful in the present invention typified by A-C® polyethylene waxes, available from Allied-Signal Corporation, Morristown, N.J., have an average number molecular weight ranging from 1500 to about 2500. Melting points range from about 90° C. to about 120° C., average viscosity at 140° C. of from about 100 cps to about 4000 cps.

In the composition of the present invention, a polyethylene wax, A-C® 6-polyethylene, available from Allied-Signal Corporation, Morristown, N.J., is preferred. This is a low molecular weight polymer with low melt viscosity, number average molecular weight of about 2000, average viscosity 180 cps/140° C., and a melting point of 219°–226° F.

In accordance with the present invention, an optical fiber buffer tube compound has been developed which has low temperature flowability at −40° C., continued high temperature consistency at +80° C. and stable viscosity upon exposure to high temperature for prolonged periods, as determined by a flowability test at −40° C. measuring the consistency of the composition by penetration of a standard cone, ASTM D–937, a slump test at +80° C., and a heat aging test at 93° C., followed by the low temperature flowability test at −40° C.

The penetration of the standard cone into the compound is measured in tenths of a millimeter under the prescribed conditions of weight, time and temperature. A cone penetration reading of greater than 160 micrometers at −40° C. indicates the consistency of the compound and hence the flowability. The slump test consists of placing the compound in a metal channel which is then placed on its side in an oven at 80° C. for 24 hours. The compound must not flow out of the channel during the test period. Any contraction and separation of liquid from the composition indicates phase separation. The heat aging test requires a cone penetration of greater than 160 micrometers at −40° C. after 45 minutes at 93° C.

In accordance with the present invention, it has been discovered that a composition of polybutene of number average molecular weight of about 460 comprising, a linear polymer of chain length of about 10–30 carbon atoms, in the presence of a hydrophobic polymer of silica and a polyethylene wax, demonstrates thixotropic characteristics over the above temperature range, is hydrophobic, and demonstrates a stable viscosity over a broad temperature range.

The composition of the present invention has the following physical properties:

Melting Point (as measured by ASTM D127), at least above 93° C.;

Viscosity (Brookfield)/120° F., (as measured by ASTM D2669) within the range of about 300,000 to about 500,000 cps.

Cone Penetration/−40° C., (as measured by ASTM D–937) within the range of 160–260 units, measured as micrometers.

The invented compositions are also characterized by being thixotropic. The term "thixotropic" is used herein to denote the property of certain materials to thicken and to change rapidly, on standing, from a liquid into a gel-like solid mass or body having sufficient cohesive strength to withstand distortion by gravitational force when suspended freely in an inverted receptacle on a coated object. The gel is also of such a nature that it can be fluidized by the application of mechanical agitation as by shaking, stirring, vibrating, and the like. The property of thixotropy as understood herein is thus characterized by a reversible isothermal sol/gel transition.

The key to the formulations of the invented fiber optic buffer tube compounds which can pass both the slump test and the cone penetration test is in the ratio of polybutene, thixotropic/gelling agent, and polyethylene wax. The polybutene exerts a considerable influence on the end product in terms of viscosity and to its resistance to physical breakdown and thus its extrusion capability. The thixotropic/gelling agent, although present in a minor percentage, in combination with polyethylene and/or synthetic wax, produces the desired "setting up" and thixotropic/gelation characteristic of the finished compound. The specific polyethylene wax suitably maintains the resistance to flow at high temperatures.

As an optional ingredient, an antioxidant may be included in the invented composition up to about 1.0% by weight, based on the weight of the composition. Any of the well known antioxidants for stabilizing organic substances and materials may be used: for instance, suitable antioxidants for use in the compositions of this invention are those disclosed in British Pat. Specification No. 1,117,771 of Union Carbide Corporation, published Jun. 26, 1968, and in U.S. Pat. No. 3,156,728 of Orloff et al. granted Nov. 10, 1964, and the reference "Autoxidation and antioxidants," Lundberg, Interscience Publisher, Inc., New York (1962).

The fiber optic buffer tube compound of the present invention is prepared as follows:

The polybutene and polyethylene wax are introduced as a mixture into a suitable vessel, thoroughly blended and is heated, while stirring, to a temperature in the range of 110°–120° C. This temperature is critical to ensure proper solution of the polyethylene wax. Any paddle stirring device known to those skilled in the art may be useful for this purpose, with the proviso that it be made of a material which is inert to the ingredients of the mixture at the temperatures employed and which does not deleteriously affect the finished product. For instance, the paddle stirrer used may be chosen from one of those described in pages 1204–1207 of Perry's "Chemical Engineers' Handbook," 3rd Edition (1950), McGraw-Hill Book Co., N.Y.

Since a thixotrope is to be included in the compositions of this invention, the mixture of polybutene and polyethylene wax, after complete solution of the latter, is cooled to about 100° C., at which point the thixotrope is added, and the mass is mixed until the thixotrope is completely dispersed in the polybutene/polyethylene blend.

It is necessary that the mixing vessel and stirrers be made of a material which would be inert relative to the ingredients of the composition at the temperatures employed during preparation of said composition and which would not deleteriously affect the finished product. A suitable material of construction is stainless steel; however other known materials of construction may be chosen by those skilled in the art, as long as such materials meet the requirements mentioned above. Iron or mild steel vessels and stirrers are unsuitable for making the compositions of this invention, since iron pickup from such vessels and/or stirrers would have a deleterious effect on the electrical properties of the finished composition.

After the polyethylene wax, polybutene and thixotrope have completely mixed, the mixture is cooled to ambient temperature.

The following examples represent compositions prepared as fiber optic buffer tube compounds. Examples 1–8 illustrate that compositions other than the indicated compositions are unsatisfactory as fiber optic buffer tube compounds. Example 8, Formulation 2, represents a preferred composition in accordance with the present invention. The percentages are given by weight. An optional antioxidant is present in each formulation.

EXAMPLE 1

The following example illustrates that compositions comprising polyalkylene oxide polyol are unsatisfactory as a fiber optics buffer tube compound. The test results were unacceptable.

Polyalkylene oxide polyol (Arco PPG 3025 and Arco PPG 4025) (Arco Chemical Co., Philadelphia, Pa.), treated fumed colloidal silica (Cab-O-Sil® TS 720) (Cabot Corporation, Tuscola, Ill.), and Irganox® 1010 (Ciba-Geigy Corp., Hawthorne, N.Y.), as an antioxidant were charged to a stainless steel one-pint beaker and heated to 140° F. (60° C.) with stirring at 7000 to 8000 rpm to blend the mixture. The mixture was then heated to 250° F. (121° C.) at 4000 rpm for 15 minutes. The mixture was cooled at a cooling rate of 40° F. (22° C.) per hour until ambient temperature was reached. The compositions were then tested by the drip test and cone penetration test. Formulations and results were as follows:

|  | Formulation | |
|---|---|---|
|  | 1 Parts By Weight | 2 Parts By Weight |
| Arco PPG 3025[1] | 178 |  |
| Arco PPG 4025[1] |  | 180 |
| Cab-O-Sil® TS-720[2] | 18 | 16 |
| Irganox® 1010[3] | 4 | 4 |
| Total | 200 | 200 |
| Results |  |  |
| Drip Test at 80° C. (–176° F.) | Fail | Fail |
| –Minutes | 10 | 15 |
| Cone Penetration ASTM-D-217 | 212.3 | 204 |

[1]Arco Chemical Co., Philadelphia, PA
[2]Cabot Corp., Tuscola, IL
[3]Ciba-Geigy, Hawthorne, N.Y.

EXAMPLE 2

Combinations comprising different ratios of polybutene, number average molecular weight 395, and Bowax 2015, IGI Baychem, Inc., Houston Tex., polyethylene wax, were prepared by the procedure of Example 1. Bowax 2015 is a low molecular weight polyethylene wax, ring and ball softening point 245° F., and specific gravity 0.94, Bowax 2015, Irganox® 1010, and polybutene were mixed at 240° F. at 2200 rpm for 15 minutes. An aliquot portion was removed and replaced with colloidal silica with mixing at 4600, 3000, and 4400 rpm and heating to 270° F. for 10 minutes. Seven formulations were prepared and tested as to drip test and cone penetration test ASTM D–937. All formulations failed the drip test and the cone penetration test. Details of the formulations and tests were as follows:

|  | Parts By Weight | | | | | | |
|---|---|---|---|---|---|---|---|
| Formulation | 1 | 2 | 3 | 4 | 5 | 6 | 7 |
| Polybutene Amoco L-65[1] | 170 | 170 | 170 | 190 | 190 | 180 | 180 |
| Bowax 2015[2] | 30 | 30 | 30 | 10 | 10 | 20 | 20 |
| Irganox® 1010[3] | 0.8 | 4 | 8 | 0.8 | 0.8 | 0.8 | 0.8 |
| Aliquot Removal | 18 | 18 | 18 | 12 | 24 | 12 | 24 |
| Treated Fumed Col. Silica (Cab-O-Sil® TS-720)[4] | 18 | 18 | 18 | 12 | 24 | 12 | 24 |
| Drip Test at 80° C. (–176° F.) | Fail | Fail | Fail | Fail | Fail | Fail | Fail |
| –Minutes | — | — | — | 5 | 30 | 5 | 30 |
| Cone Penetration |  |  |  |  |  |  |  |
| –40° C. - Avg. | 39.7 | 39.7 | 32.7 | 134.7 | 79 | 71.8 | 35.5 |
| –40° C. after 250° F. aging | 28.6 | 22.0 | 23.0 | — | — | — | — |

[1]Amoco Corp., Chicago, IL
[2]IGI Baychem, Houston, TX
[3]Ciba-Geigy, Hawthorne, N.Y.
[4]Cabot Corp., Tuscola, IL The above data indicate that compositions comprising polybutene, average number molecular weight 395, and low molecular weight polyethylene wax, Bowax 2015, in the presence of treated fumed colloidal silica, are unsatisfactory for fiber optic buffer tube compounds.

EXAMPLE 3

The procedure of Example 2 was repeated but a hydrocarbon wax, Amoco waxes, R-50 and R-235, was substituted for the polyethylene wax, Bowax 2015. Amoco waxes R-50 and R-25 are low molecular weight hydrocarbon paraffin waxes. After mixing the polybutene, hydrocarbon wax and the antioxidant, at 220 rpm for 15 minutes an aliquot portion was removed and an aliquot amount of treated fumed colloidal silica was added to the mixture with mixing. Formulations and results were as follows:

| Formulation | Parts By Weight | | | | | | | | | |
|---|---|---|---|---|---|---|---|---|---|---|
| | 1 | 2 | 3 | 4 | 5 | 6 | 7 | 8 | 9 | 10 |
| Polybutene L-65[1] | 190 | 190 | 180 | 180 | 170 | 170 | 180 | 180 | 170 | 170 |
| Amoco Wax | | | | | | | | | | |
| R-50[2] | 10 | 10 | 20 | 20 | 30 | 30 | — | — | — | — |
| R-25[2] | — | — | — | — | — | — | 20 | 20 | 30 | 30 |
| Irganox ® 1010[3] | 0.8 | 0.8 | 0.8 | 0.8 | 0.8 | 0.8 | 0.8 | 0.8 | 0.8 | 0.8 |
| Temperature °F. | 260 | 260 | 220 | 220 | 220 | 220 | 220 | 220 | 220 | 220 |
| Aliquot Removal | 12 | 24 | 12 | 18 | 12 | 18 | 12 | 18 | 12 | 18 |
| Cab-O-Sil ® TS-720[4] | 12 | 24 | 12 | 18 | 12 | 18 | 12 | 18 | 12 | 18 |
| Mix 10 Minutes | | | | | | | | | | |
| RPM | 7000 | 7000 | | | 2200 to 2800 | | | | | |
| Temp °F. | 260 | 260 | | | 220° F. | | | | | |
| Results | | | | | | | | | | |
| Drip Test | Fail | Fail | Fail | Fail | Fail | Fail | Fail | Fail | Fail | Fail |
| Slump Test | — | — | Fail | Fail | Fail | Fail | Fail | Fail | Fail | Fail |
| Cone Penetration | 61.3 | 65.3 | 48 | 41.6 | 42.3 | 40.3 | 61 | 49 | 32.3 | 43.6 |

[1]Amoco Corp., Chicago, IL
[2]Amoco Corp., Chicago, IL
[3]Ciba-Geigy, Hawthorne, N.Y.
[4]Cabot Corp., Tuscola, IL The above data indicates that substitution of a hydrocarbon wax for polyethylene wax does not improve the results of the cone penetration test.

EXAMPLE 4

Formulations comprising polybutene and polyethylene wax compounds, Baychem 8000-2262-4, in mixtures with treated fumed colloidal silica were investigated. Baychem 8000-2262-4 is a modified high density polyethylene wax with a viscosity of 3650 cps at 325° F., ring and ball softening point of 246° F. and specific gravity 0.95. All formulations failed either the cone penetration test and the slump test, or both tests separately.

In the procedure of Example 3, formulations were prepared with mixing at 2000 rpm for 10 minutes with heat to a temperature of 230° F. After mixing, an aliquot portion was removed and replaced with a thixotrope, followed by mixing and heating. Formulations and results were as follows:

| Formulation | Parts By Weight | | | | | |
|---|---|---|---|---|---|---|
| | 1 | 2 | 3 | 4 | 5 | 6 |
| Polybutene - L14[1] | 180 | 180 | 170 | 170 | 190 | 190 |
| Baychem 8000-2262-4[2] | 20 | 20 | 30 | 30 | 10 | 10 |
| Irganox ® 1010[3] | 0.8 | 0.8 | 0.8 | 0.8 | 0.8 | 0.8 |
| Temperature °F. | 245 | 245 | 245 | 245 | 245 | 245 |
| Aliquot Removal | 12 | 18 | 12 | 18 | 12 | 18 |
| Cab-O-Sil ® TS-720[4] added | 12 | 18 | 12 | 18 | 12 | 18 |
| Mix-RPM | 2000–2600 | | | | | |
| Temperature °F. | 230 | | | | | |
| Results | | | | | | |
| Cone Penetration −40° C. | 131 | 128 | 65 | 48 | 225 | 196 |
| Slump | Fail | Pass | Pass | Pass | Fail | Fail |

-continued

| Formulation | Parts By Weight | | | | | |
|---|---|---|---|---|---|---|
| | 1 | 2 | 3 | 4 | 5 | 6 |

[1]Amoco Corp., Chicago, IL
[2]IGI Baychem, Houston, TX
[3]Ciba-Geigy, Hawthorne, N.Y.
[4]Cabot Corp., Tuscola, IL

EXAMPLE 5

The procedure of Example 4 was repeated with other levels of Baychem 8000-2262, polyethylene wax, and treated fumed colloidal silica. The formulations were prepared in a first mixture with heat to 240° F. with stirring at 2000 rpm. An aliquot amount was removed from the mixture and replaced by an aliquot amount of treated fumed colloidal silica which was initially blended in by hand mixing, followed by mixing at 2400–2600 rpm for about 10 minutes at 230° F. All formulations failed either the cone penetration test or the slump test, or both tests separately. Formulations and results were as follows:

| Formulation | Parts By Weight | | | | | |
|---|---|---|---|---|---|---|
| | 1 | 2 | 3 | 4 | 5 | 6 |
| Polybutene - L14[1] | 188 | 186 | 184 | 182 | 190 | 190 |
| Baychem 8000-2262[2] | 12 | 14 | 16 | 18 | 10 | 10 |
| Irganox ® [3] | 0.8 | 0.8 | 0.8 | 0.8 | 0.8 | 0.8 |
| Aliquot Removal | 18 | 18 | 18 | 18 | 18 | 18 |
| Cab-O-Sil ® TS 720[4] added | 18 | 18 | 18 | 18 | 18 | 18 |
| Results | | | | | | |
| Cone Penetration −40° C. Average | 207 | 173 | 161 | 155 | 181 | 181 |

-continued

| Formulation | Parts By Weight | | | | | |
|---|---|---|---|---|---|---|
| | 1 | 2 | 3 | 4 | 5 | 6 |
| Slump - 176° F. (Horizontal 24 hrs) | Fail | Fail | Fail | Pass | Fail | Fail |
| Minutes | 5 | 25 | 150 | — | 10 | 15 |

[1]Amoco Corp., Chicago, IL
[2]IGI Baychem, Houston, TX
[3]Ciba-Geigy, Hawthorne, N.Y.
[4]Cabot Corp., Tuscola, IL

EXAMPLE 6

Example 5 was repeated with cellulose fibers (Interfibe B03-93)(Interfibe Corp., Solon. Ohio) in Formulations 1–4 as the thixotrope instead of fumed silica, and with polyethylene wax AC®-6. Separate formulations were prepared with Petrolite Be Square 175, Petrolite Corp., Tulsa, Okla., and fumed silica (Cab-O-Sil®) in Formulations 5–8. Petrolite Be Square 175 is a microcrystalline wax, density 0.93/77° F., melt point 182° F., viscosity 85 SUS/210° F. The formulations were prepared in a first mixture with heat with stirring, Allied Signal AC®-6® wax (Allied-Signal Corp., Morristown, N.J.), to 180° F., Petrolite Be Square 175 to 220° F. Stirring was at 2000 rpm for 15 minutes. An aliquot was removed and replaced with a thixotrope, Cab-O-Sil® TS–720 or Interfibe B03-93. Each initially was mixed in by hand stirring, then with application of heat and stirring. Cab-O-Sil® TS-720 was mixed at 200° F. at 200 rpm for 10 minutes; 20 wt % Interfibe B03-93 at 160° F. at 2000 rpm and 80 wt % at 190° F. at 3000–4000 rpm. The prepared samples were aged at 176° F. in a horizontal position for 24 hrs before the slump test. All formulations failed the cone penetration test and the slump test.

beaker and heated to 208° F. with stirring at 2000 rpm. The Allied Signal polyethylene wax AC®-6® was added with hand mixing followed by mixing at 2400 rpm at 204° F. for formulations 1, 2 and 3. Formulations 4 and 5 were mixed at 2200 rpm and 3000 rpm respectively and heated to 206° F. for 10 minutes. An aliquot portion was removed and replaced with a thixotrope, Cab-O-Sil® TS-720. All formulations failed the prescribed tests. Formulations and results were as follows:

| Formulation | Parts By Weight | | | | |
|---|---|---|---|---|---|
| | 1 | 2 | 3 | 4 | 5 |
| Polybutene - L14[1] | 1131 | 1170 | — | 650 | 650 |
| Polybutene L-65[1] | — | — | 1170 | — | — |
| Polyethylene Wax AC ® -6[R][2] | 169 | 130 | 130 | 32.5 | 52 |
| Irganox ® 1010[3] | 2.6 | 2.6 | 2.6 | 2.6 | 2.6 |
| Ethyl Ethylflo 164[4] | — | — | — | 520 | 481 |
| Cab-O-Sil ® TS-720[5] | 9.5 | 96.0 | 91.0 | 97.5 | 117 |
| Results | | | | | |
| Slump - 176° F. Horizontal Cone Penetration | Fail | Fail | Fail | Fail | Fail |
| at −40° C. | 125 | 218 | 175 | 225 | 230 |
| Avg. Mol. Wgt | 538 | 488 | 55 | 857 | 444 |

[1]Amoco Corp., Chicago, IL
[2]Allied-Signal Corp., Morristown, N.J.
[3]Ciba-Geigy, Hawthorne, N.Y.
[4]Ethyl Corp., Baton Rouge, LA
[5]Cabot Corp., Tuscola, IL The above data indicate that the average molecular weight of the compound comprising polybutene and wax within the range of from about 400 to 500 does not insure that the composition will pass the slump test.

| Formulation | Parts By Weight | | | | | | | |
|---|---|---|---|---|---|---|---|---|
| | 1 | 2 | 3 | 4 | 5 | 6 | 7 | 8 |
| Polybutene - L14[1] | 180 | 170 | 180 | 170 | 180 | 170 | 180 | 170 |
| Polyethylene Wax AC ® 6[R][2] | 20 | 30 | 20 | 30 | — | — | — | — |
| Petrolite Be Square 175[3] | — | — | — | — | 20 | 30 | 20 | 30 |
| Irganox ® 1010[4] | 0.8 | 0.8 | 0.8 | 0.8 | 0.8 | 0.8 | 0.8 | 0.8 |
| Aliquot Removal | 20 | 20 | 40 | 40 | 12 | 12 | 18 | 18 |
| Cab-O-Sil ® TS-720[5] | — | — | — | — | 12 | 12 | 18 | 18 |
| Interfibe B03-93[6] | 20 | 20 | 40 | 40 | — | — | — | — |
| Results | | | | | | | | |
| Cone Penetration −40° C. | 89 | 41 | 44 | 30 | 145 | 115 | 134 | 99 |
| Slump - 176° F. | Fail | Fail | Fail | Fail | Fail | Fail | Fail | Fail |

[1]Amoco Corp., Chicago, IL
[2]Allied-Signal Corp., Morristown, N.J.
[3]Petrolite Corp., Tulsa, OK
[4]Ciba-Geigy, Hawthorne, N.Y.
[5]Cabot Corp., Tuscola, IL
[6]Interfibe Corp., Solon, OH

EXAMPLE 7

The procedure of Example 6 was repeated using Ethyl Ethylflo 164, Ethyl Corp., Baton Rouge, La., in Formulations D and E to replace polybutene L-65 to compare with Formulations A and B. In Formulation C, Polybutene L-65 was substituted for L-14. Ethyl Ethylflo 164 is a polyalpha olefin, a hydrogenated hydrocarbon comprising 85% decene trimer and 15% decene tetramer. Molecular weight is 437, specific gravity 0.818 and pour point −70° C., ASTM D97. Each formulation was charged to a ½ gallon stainless steel

EXAMPLE 8

The procedure of Example 7 was repeated with Ethyl Ethylflo 164, polybutene H-15, H-1900, L-14 and L-100, and Allied Signal AC®-6 polyethylene wax. Polybutene, Ethylflo 164 and Cab-O-Sil® TS-720 were added to a stainless steel 1-pint beaker and mixed at room temperature for blend 1. Blends 2, 3 and 4 were blended by charging polybutene and Allied Signal AC®-6 to a stainless steel 1-pint beaker, heating the charge to 218° F. at 2000 rpm and then adding Cab-O-Sil® TS-720 with hand stirring first, then a Cowles mixer at 208° F. at 2000 rpm. Only Formulation 2 passed the prescribed tests. Formulation and results were as follows:

|  | Parts By Weight | | | |
|---|---|---|---|---|
| Formulation | 1 | 2 | 3 | 4 |
| Polybutene - H-15[1] | 87 | — | — | — |
| Polybutene L-100[1] | — | 88 | — | — |
| Ethyl Ethylflo 164[2] | 5 | — | — | — |
| Cab-O-Sil ® TS-720[3] | 8 | 10 | 10 | 8 |
| Polybutene L-14[1] | — | 13 | 68 | 69 |
| Polybutene H-1900[1] | — | — | 20 | 21 |
| Polyethylene Wax AC ® -6(R)[4] | — | 2 | 2 | 2 |
| Irganox ® 1010[5] | — | 0.8 | 0.8 | 0.8 |
| Results | | | | |
| Slump-176° (Horizontal) | Fail | Pass | Fail | Fail |
| Cone Penetration –40° C. | 210 | 182 | 183 | 195 |
| Mol. Wgt. | 553 | 494 | 770 | 799 |

[1]Amoco Corp., Chicago, IL
[2]Ethyl Corp., Baton Rouge, LA
[3]Cabot Corp., Tuscola, IL
[4]Allied-Signal Corp., Morristown, N.J.
[5]Ciba-Geigy, Hawthorne, N.Y.

EXAMPLE 9

The procedure of Example 8 was repeated with Ethyl Ethylflo 164, Shell block copolymer Kraton D1107 and Amoco Polybutene L-65. Kraton D1107, a styrene-isoprene-styrene block copolymer, replaced the polyethylene wax AC®-6®. The L-65, Ethylflo 164, Kraton D1107 and Irganox 1010 were charged to a stainless steel beaker with stirring at 2000 RPM and heated to 340° F. for about 45 minutes. An amount of the above blend was removed and replaced with an equal amount of Cab-O-Sil® TS720 after the blend had cooled to 250° F., the mix was then blended by hand and then by a Cowles mixer at 2200–2400 RPM for 10 minutes without application of heat. All formulations failed the drip test. Formulations and results were as follows:

| Formulation | 1 | 2 | 3 | 4 | 5 | 6 |
|---|---|---|---|---|---|---|
| Amoco Polybutene L-65[1] | 188.2 | 188.2 | 185.6 | 182.4 | 180.6 | 171 |
| Ethyl Ethylflo 164[2] | 9.8 | 9.8 | 9.6 | 9.6 | 9.4 | 9 |
| Shell Kraton D1107[3] | 2 | 2 | 6 | 8 | 10 | 20 |
| Ciba-Geigy Irganox ® 1010[4] | 0.8 | 0.8 | 0.8 | 0.8 | 0.8 | 0.8 |
| Aliquot Removal | 10 | 16 | 16 | 12 | 10 | 20 |
| Cab-O-Sil ® TS-720[5] | 10 | 16 | 16 | 12 | 10 | 20 |
| Results | | | | | | |
| Drip Test at 176° F. | Fail | Fail | Fail | Fail | Fail | Fail |
| Vertical –Minutes | 0 | 1 | 1 | — | — | — |
| Cone Penetration - 24 hrs. Average | 233 | 196 | 212 | 204 | 205 | 175 |

[1]Amoco Corp., Chicago, IL
[2]Ethyl Corp., Baton Rouge, LA
[3]Shell Chemical Co., N.Y., N.Y.
[4]Ciba-Geigy, Hawthorne, N.Y.
[5]Cabot Corp., Tuscola, IL

EXAMPLE 10

The following example illustrates that the instant invented composition exhibits softness at low temperatures of –40° C. after a heat history of 93° C. and thus will not cause a mechanical stressing of fiber optic elements at low temperatures after exposure to high temperatures. The example also illustrates the invented composition does not demonstrate a phase separation after exposure to a high temperature for prolonged periods.

The procedure of Example 8 was repeated with polybutene L-100, Cab-O-Sil® TS-720 and Allied-Signal polyethylene wax AC®6. Polybutene L-100, Irganox® 1010 and polybutene wax AC®6 were charged to a one gallon stainless steel beaker and heated to 230° F. for one hour with mixing at 2000 rpm. Cab-O-Sil®TS-720 was added at a temperature of about 208° F. and mixed for about 10 minutes, the temperature rising to 218° F. at 3400 rpm. The mixture was then held at 200° F. (93° C.) for 45 minutes and then allowed to cool to room temperature, +21° C. The composition did not exhibit any phase separation and exhibited softness at –40° C.

Formulation and test results were as follows:

| Formulation | Weight % | Parts By Weight | | | |
|---|---|---|---|---|---|
| | | 1 | 2 | 3 | 4 |
| Polybutene - L100 | 88 | 2200 | 2200 | 2200 | 2200 |
| Cab-O-Sil ® TS-720 | 10 | 250 | 250 | 250 | 250 |
| Polyethylene Wax AC ® -6) | 2 | 50 | 50 | 50 | 50 |
| Irganox ® 1010 | 0.39 | 7.5 | 7.5 | 7.5 | 8.5 |
| Results | | | | | |
| Slump - 176° F. Horizontal | | Pass | Pass | Pass | Pass |
| Cone Penetration - 40° C. | | 186–192 | 172–184 | 163–168 | 165–170 |
| Heat Age Slump | | Pass | Pass | Pass | Pass |
| Heat Age Cone Penetration | | 168–172 | 170–171 | 162–165 | 164–166 |

There was no evidence of phase separation after the heat exposure period.

That which is claimed is:

1. A thixotropic gel fiber optic buffer tube composition resistant to syneresis and phase separation comprising:

(a) about 86 to about 90% by weight of a polybutene having a viscosity within the range of from about 576 to about 2441 SUS/38° C., a number average molecular weight within the range of from about 380 to about 560, and a specific gravity within the range of from about 0.845 to about 0.871 at 15.5° C.;

(b) about 8 to about 12% by weight of a finely divided hydrophobic fumed silica which has been treated with a dimethyl silicone fluid to replace surface hydroxyl groups on the fumed silica with a polydimethyl siloxane polymer; and (c) about 1 to about 6% by weight of a low molecular weight polyethylene wax having a number average molecular weight within the range of from about 1500 to about 5000, an average viscosity within the range of from about 100 to 250 cps/140° C., and a high melting point within the range of from about 200° F. to about 240° F.

2. The composition of claim 1 wherein kinematic viscosity of said polybutene is in the range of from about 210 to about 227 cst/38° C., number average molecular weight of said polybutene is about 460 and specific gravity of said polybutene is in the range of from about 0.850 to about 0.865.

3. The composition of claim 1 wherein said low molecular weight polyethylene wax has a number average molecular weight of about 2000, an average viscosity of about 180 cps/140° C. and a melting point within the range of about 219° F. to about 226° F.

4. The composition of claim 1 wherein said composition comprises about 88% by weight of said polybutene, about 10% by weight of said finely divided hydrophobic fumed silica and about 2% by weight of said low molecular weight polyethylene wax.

5. The composition of claim 1 wherein said composition comprises:

(a) about 88% by weight of said polybutene, wherein kinematic viscosity of said polybutene is in the range of from about 210 to about 227 cst/38° C., number average molecular weight of said polybutene is about 460, and specific gravity of said polybutene is in the range of from about 0.85 to about 0.865;

(b) about 10% by weight of said finely divided hydrophobic fumed silica which has been treated with a dimethyl silicone fluid to replace surface hydroxyl groups on the fumed silica with a polydimethyl siloxane polymer, and (c) about 2% by weight of said low molecular weight polyethylene wax having a number average molecular weight of about 2000, an average viscosity of about 180 cps/140° C. and a melting point within the range of from about 219° F. to about 226° C.

* * * * *

UNITED STATES PATENT AND TRADEMARK OFFICE
CERTIFICATE OF CORRECTION

PATENT NO.: 5,505,773

DATED: April 9, 1996

INVENTOR(S): Egils Vitands, Robin M. Gryziecki

It is certified that error appears in the above-identified patent and that said Letters Patent is hereby corrected as shown below:

| Col. | Line | |
|---|---|---|
| 12 | 53 | in the table entitled "Parts By Weight" the phrase --for 24 hrs.--Avg.-- should be inserted after the phrase "250°F. aging" in the column "Cone Penetration" |
| 17 | 12 | in the table entitled "Parts By Weight" and in the column labeled "2" "13" should read -- ⎯ -- |

Signed and Sealed this

Thirtieth Day of July, 1996

Attest:

BRUCE LEHMAN

*Attesting Officer*  *Commissioner of Patents and Trademarks*